United States Patent [19]

Greenstein et al.

[11] Patent Number: 5,784,701
[45] Date of Patent: *Jul. 21, 1998

[54] METHOD AND SYSTEM FOR DYNAMICALLY CHANGING THE SIZE OF A HARDWARE SYSTEM AREA

[75] Inventors: Paul Gregory Greenstein, Fishkill; Richard Roland Guyette, Lagrangeville; John Ted Rodell, Wappingers Falls, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 530,784

[22] Filed: Sep. 19, 1995

[51] Int. Cl.⁶ .................................................. G06F 12/02
[52] U.S. Cl. .................................... 711/173; 711/170
[58] Field of Search .......................... 395/621, 497.01, 395/497.04; 711/170, 173; 707/205

[56] References Cited

U.S. PATENT DOCUMENTS

| | | | |
|---|---|---|---|
| 4,041,462 | 8/1977 | Davis et al. | 395/569 |
| 4,430,727 | 2/1984 | Moore et al. | 711/115 |
| 4,639,862 | 1/1987 | Wada et al. | 395/842 |
| 4,843,541 | 6/1989 | Bean et al. | 395/856 |
| 5,058,003 | 10/1991 | White | 711/209 |
| 5,159,677 | 10/1992 | Rubsam et al. | 711/2 |
| 5,170,472 | 12/1992 | Cwiakala et al. | 395/828 |
| 5,179,662 | 1/1993 | Corrigan et al. | 711/2 |
| 5,269,009 | 12/1993 | Herzl et al. | 711/141 |
| 5,283,868 | 2/1994 | Baker et al. | 395/200.57 |
| 5,377,337 | 12/1994 | Antognini et al. | 395/670 |

*Primary Examiner*—Eddie P. Chan
*Assistant Examiner*—Kevin L. Ellis
*Attorney, Agent, or Firm*—William A. Kinnaman, Jr.; Heslin & Rothenberg, P.C.

[57] ABSTRACT

In a data processing system, a hardware system area ("HSA") storage is associated with the hardware configuration of the system. A change in the system hardware configuration typically corresponds to a change in HSA size. Upon determination of the requirement for, for example, increasing the size of HSA, a region of storage is freed from use as central storage or expanded storage. The freed region is incorporated into the data processing system as HSA storage. The process may be reversed to reduce the size of HSA by converting a region of HSA into either central storage or expanded storage.

44 Claims, 5 Drawing Sheets fig. 1 fig. 8 fig. 2 fig. 3

CONVERTING CSTORE OR ESTORE TO HSA fig. 4

CONVERTING HSA TO CSTORE OR ESTORE fig. 5

CONVERTING CSTORE TO ESTORE fig. 6

CONVERTING ESTORE TO CSTORE fig. 7

5,784,701

METHOD AND SYSTEM FOR DYNAMICALLY CHANGING THE SIZE OF A HARDWARE SYSTEM AREA

TECHNICAL FIELD

The present invention relates to memory management in a data processing system. More particularly, the present invention relates to techniques for dynamically changing the size of a hardware system area ("HSA") in a data processing system.

BACKGROUND OF THE INVENTION

Powerful data processing systems contain vast hardware resources such as multiple processors, multiple input/output devices and large amounts of storage. An IBM Enterprise Systems Architecture ("ESA")/390 mainframe computer is an example of one such data processing system. A storage area conventionally known as a hardware system area ("HSA") is located within the system's storage. The purpose of the HSA is manyfold as it conventionally contains information that is closely associated with different hardware of the data processing system. Typical uses may include, for example, input/output queues, microcode patch areas and buffers for interprocessor communications. (Both "IBM" and "ESA/390" are trademarks of International Business Machines Corporation.)

When a data processing system is initially powered on (i.e. power on reset—"POR"), the HSA is allocated and reserved by the system hardware. The HSA is sized by the system hardware in accordance with the resources of the system. For example, a system with more input/output ("I/O") channels would require more HSA area than a system with less I/O channels. Once the HSA is sized and allocated by the system hardware, it is fixed in size.

As the data processing system continues to initialize, a system control program ("SCP") is conventionally loaded into the system. The SCP may comprise, for example, IBM's Multiple Virtual Storage ("MVS") operating system. When the SCP loads and begins its initialization sequence, it queries the system for the locations of the HSA storage such that it may respect them during loading and operations. If the SCP were to attempt to alter memory locations within the HSA, a system error would occur.

The conventional process for changing the size of the HSA requires reissuing a POR. For example, if an additional processor is added to a system, and more HSA is required, a POR is currently necessary. The POR terminates all system operations and initiates a cold start of the system. Thus, the conventional method for changing the size of the HSA is extremely operationally disruptive. This is particularly burdensome in computing environments requiring high availability. In complex computer systems, reinitialization after a POR can take hours to complete.

The present invention is directed toward solutions for the above noted problems.

DISCLOSURE OF THE INVENTION

Briefly described, in a first aspect, the present invention includes a method for increasing the size of hardware system area ("HSA") storage in a data processing system. The HSA size is increased subsequent to initialization of the data processing system and during operation thereof. The method includes identifying a region of storage as free and incorporating the region of storage into the HSA storage such that the size thereof is increased.

As an enhancement, the identifying a region of storage as free may include freeing the region of storage from use as central storage or expanded storage. Furthermore, the region may be set off-line and removed from availability as central storage or expanded storage.

As a further enhancement the incorporating of the region as HSA may include instructing a processor controller element ("PCE") (i.e., a service processor) to engage the region of storage as HSA. This incorporating may further comprise adding the region of storage to a system control table (e.g., "SCPINFO") and informing a system control program ("SCP") that the region of storage comprises HSA storage.

In another aspect, the present invention comprises a method for decreasing the size of hardware system area ("HSA") storage in a data processing system subsequent to initialization thereof and during system operation. The method includes removing a region of storage from the HSA storage and incorporating the region of storage as a region of storage other than the HSA storage such that the size of the HSA storage is decreased.

In yet another aspect, the present invention includes a method for converting one type of storage to another type of storage. The method comprises converting the one type of storage to hardware system area ("HSA") storage and converting the HSA storage to the other type of storage. As an enhancement, the one type of storage may comprise central storage or expanded storage, and the other type of storage may then comprise the other of central storage or expanded storage.

Corresponding systems to the methods disclosed are presented herein.

To summarize, the present invention has many advantages and features associated with it. By enabling operational enlargement of HSA storage through the conversion of central storage or expanded storage thereto, system availability and maintainability are enhanced. Specifically, system maintenance comprising a POR is unnecessary each time a hardware modification requiring increased HSA size is performed. Furthermore, the techniques disclosed herein obviate any need to reserve large amounts of unused HSA in anticipation of future upgrades. HSA may also be reduced in size such that the HSA associated with removed resources is no longer unused and wasted. Such HSA may be operationally converted into useful system storage. Moreover, intermediate conversion to/from HSA may be used to convert between different storage types (e.g., central to expanded). In summary, the present invention provides an improvement to overall memory management in computing systems.

BRIEF DESCRIPTION OF THE INVENTION

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

BEST MODE FOR CARRYING OUT THE INVENTION

Figure 1:
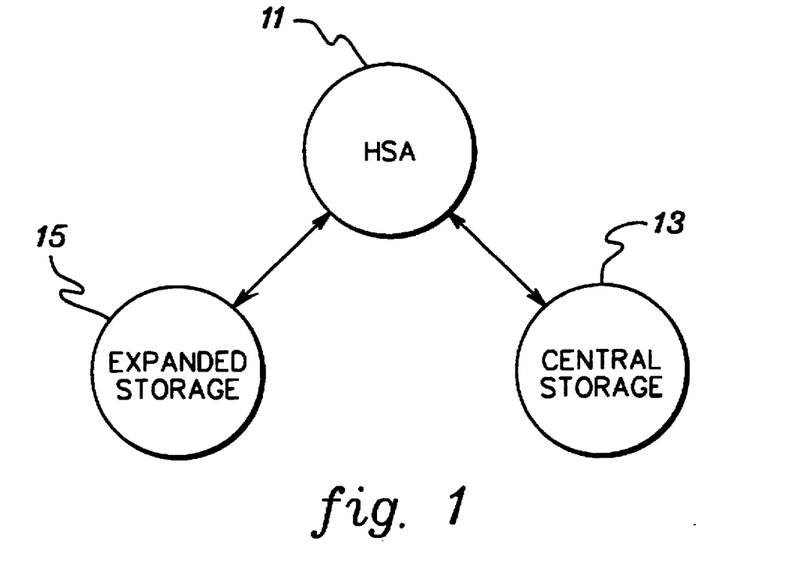
FIG. 1 is a diagram of possible conversions between different types of storage pursuant to an embodiment of the present invention.

The techniques of the present invention facilitate conversion of a storage region between HSA storage 11 and either expanded storage 15 or central storage 13 (FIG. 1). The size of HSA storage 11 is thereby changed. Advantageously, this conversion is performed during operation of the data processing system, thereby eliminating the need for a POR or other highly disruptive event. The techniques disclosed herein may further be applied to converting a storage region between expanded storage 15 and central storage 13. Specifically, for example, a region of expanded storage 15 may be converted to HSA storage 11 which is then converted to a region of central storage 13. This process may be reversed to convert a region of central storage 13 to a region of expanded storage 15. As used herein, the term "region" of storage refers to a group of memory locations in system storage, not necessarily contiguous, that may be referred to, for example, by a list of memory page addresses. The term "main storage" is used herein to refer to all memory that the CPU has access to; the term "central storage" is used herein to refer to the byte addressable memory that is accessed and used by the operating system and excludes system areas such as, e.g., the HSA; and the term "expanded storage" is used herein to refer to the block addressable memory that is accessed and used by the operating system.

Figure 8:
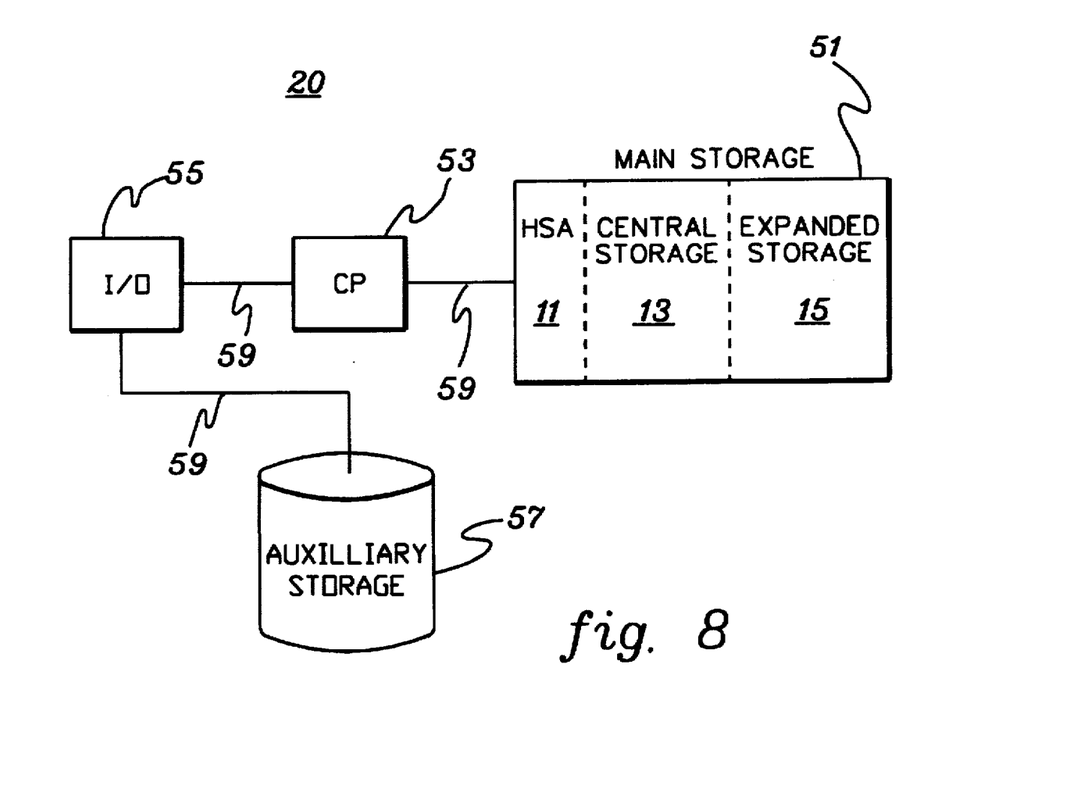
FIG. 8 is a block diagram of a computer system within which the techniques of the present invention are useful in conformance with an embodiment of the present invention.

One example of a computer system 20 that includes central storage 13, expanded storage 15 and HSA storage 11 is shown in FIG. 8. These storage areas are part of a main storage 51 of computer system 20. Main storage 51 may comprise, for example, random access memory ("RAM"). One or more central processors ("CPs") 53 are included in the system and are responsible for the processing of information. An auxiliary storage 57 may comprise, for example, disk or tape storage. An I/O facility 55 provides interfacing of computer system 20 to external devices (and storage) and may comprise, for example, a channel. The elements of computer system 20 are connected together by, e.g., bi-directional bussing 59. As a system example, computer system 20 may comprise an International Business Machines'Enterprise System Architecture/390 mainframe computing system. Processing systems with the features described hereinabove or equivalent are subject to the techniques of the present invention.

During operation of a computer system, resources may be added that require expansion of the HSA storage area (e.g., a new processor or channel). Such a requirement instigates the techniques of the present invention used to increase the size of the HSA. A region of system storage other than HSA storage (e.g., central storage or expanded storage) is accordingly converted to HSA storage to increase the size thereof.

Figure 4:
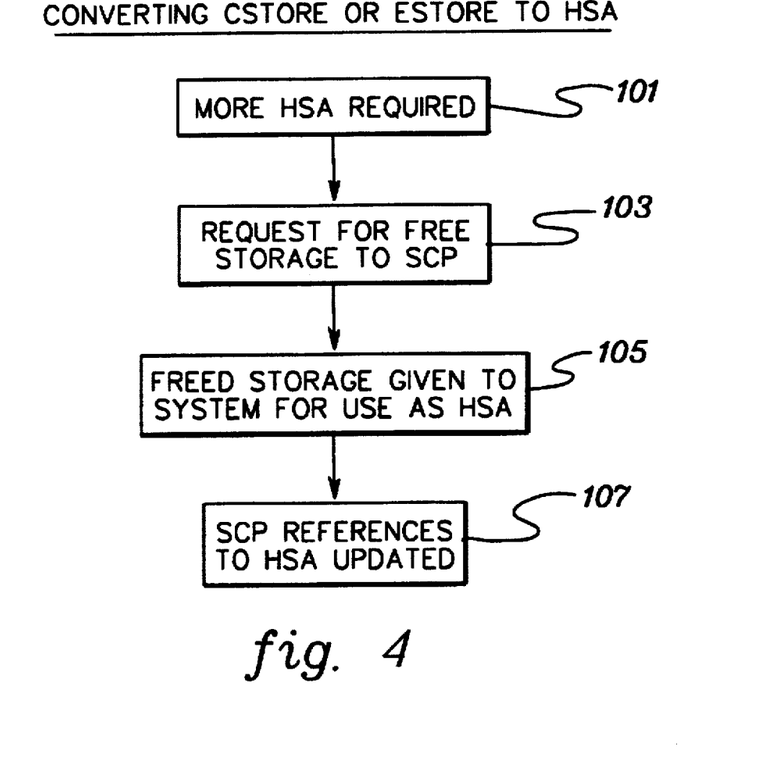
FIG. 4 is a flow diagram of a method for converting central or expanded storage to HSA storage in conformance with an embodiment of the present invention.

A method for converting a region of system storage to HSA storage is shown in the flow diagram of FIG. 4. As discussed immediately hereinabove, additional HSA is required when certain system activities occur (101). A first step in response thereto is to free a storage region from either central storage ("CSTORE") or expanded storage ("ESTORE") for conversion to HSA storage.

The SCP operationally manages both central storage and expanded storage. Thus, to free a region of either storage, a request is sent to the SCP for it to free the region of storage (103). For example, an operator at a system console (e.g., FIG. 2, reference numeral 17) may scan a system memory map to find the amount of additional HSA storage necessary. The identified region of storage is then taken off-line by the operating system as precipitated by an operator command entered from the SCP console. Taking storage off-line comprises logically taking the storage off-line followed by physically taking the storage off-line. Taking a region of storage off-line both logically and physically are individual tasks that will be apparent in view of U.S. Pat. No. 4,430,727 entitled "Storage Element Reconfiguration," issued Feb. 7, 1984, which is hereby incorporated by reference herein in its entirety.

After the storage region, which is to be used as HSA storage, is removed from use by the SCP, it may be given to the system for use as HSA storage (FIG. 4, reference numeral 105). This may be performed by an operator at a system hardware console using a service language command ("SLC")(e.g., FIG. 2, reference numeral 19). An example syntax of such a command would comprise "CONFIG STORE (<address list>), HSA|CSTORE|ESTORE," and the steps required to create this command will become apparent to one of ordinary skill in the art in view of the below discussion. The freed storage region is input to the system hardware console as a new region of HSA and it is incorporated as such. Thereafter, the SCP is instructed (e.g., from the SCP console) to update its references to HSA such that the new HSA region is recognized (107). Enlargement of HSA is accordingly complete.

Figure 2:
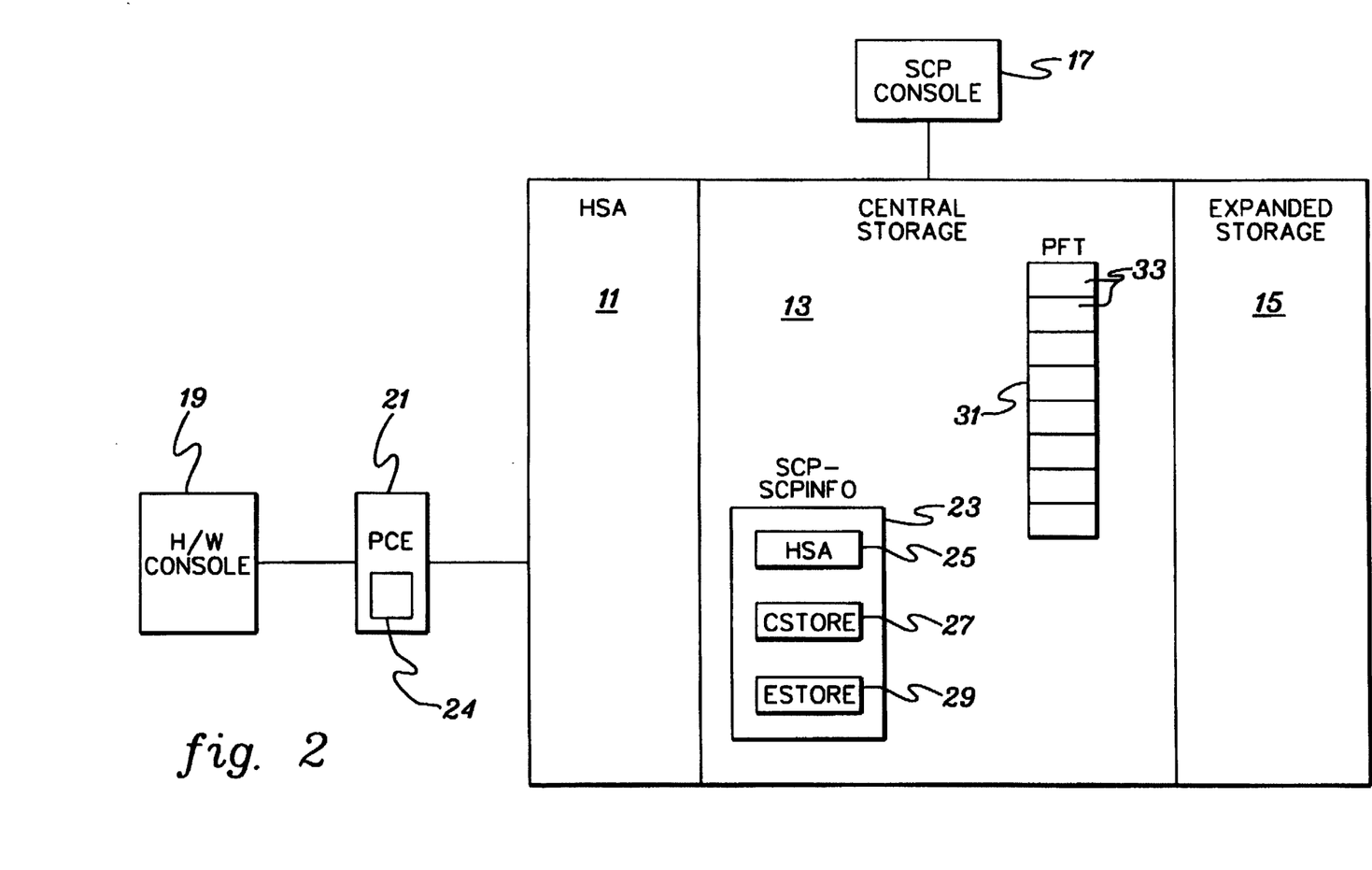
FIGS. 2 & 3 are diagrams of the storage areas of a data processing system according to one embodiment of the present invention.
Figure 3:
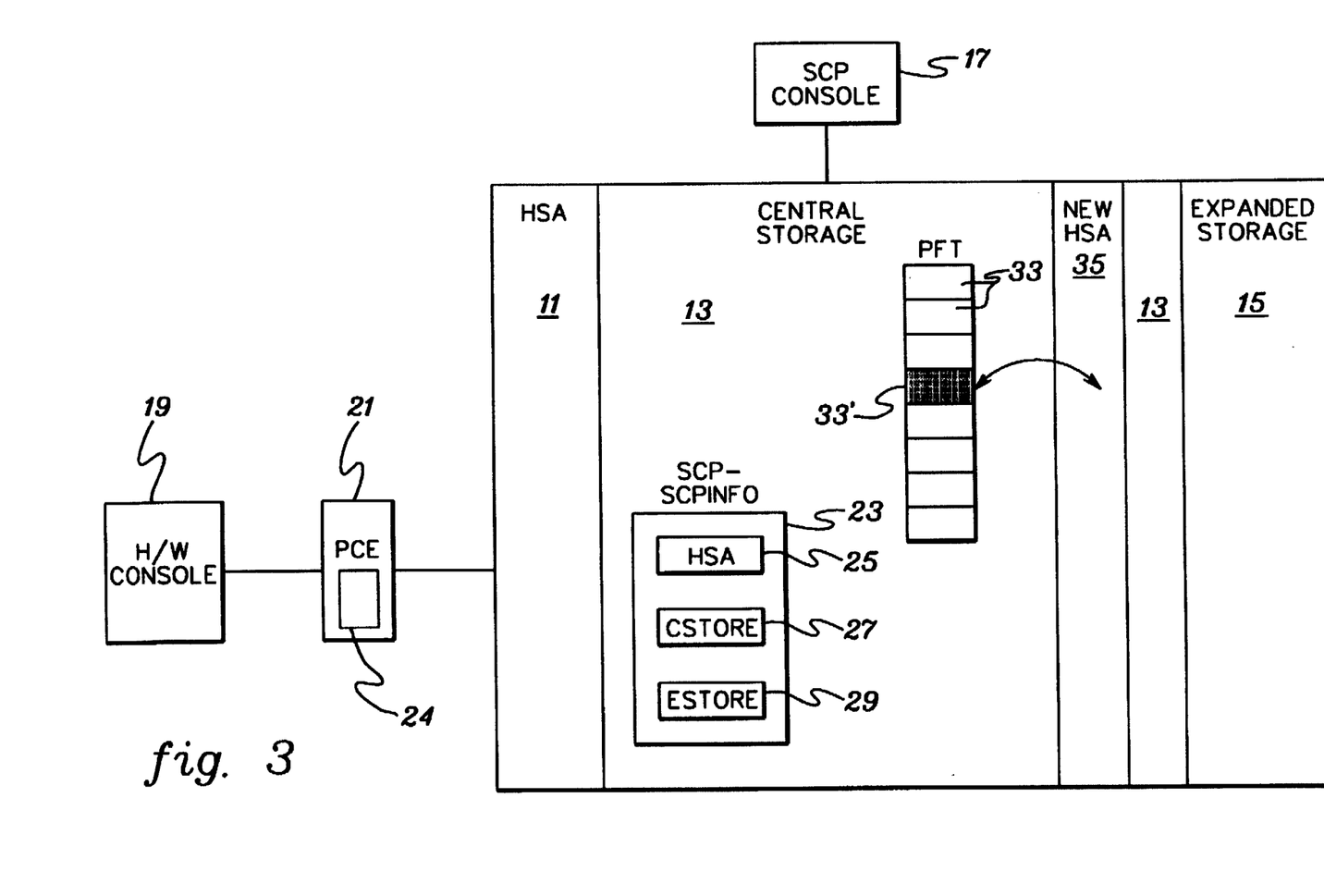

More specific details of the conversion of central storage or expanded storage to HSA storage are shown in FIGS. 2 and 3. Within central storage 13 are tables which are manipulated in accordance with the techniques disclosed herein. A Page Frame Table ("PFT") 31 contains an entry 33 for each page of central storage (and includes HSA storage pages). This table describes the status of each frame of central storage (e.g., on-line, off-line). A similar PFT exists for expanded storage (not shown). A SCP-System Control Program Information ("SCPINFO") table 23 contains lists of storage areas (i.e., pages) used by different types of storage. Specifically, there is an HSA storage list 25, a central storage list 27 and an expanded storage list 29.

Operationally, at POR, a Processor Control Element ("PCE") 21 analyses the system hardware configuration and based thereon fixes the boundaries of the HSA. After that, during Initial Program Load ("IPL") of the SCP, the boundaries of HSA 11 are read from the system hardware, corresponding central storage 13 and expanded storage 15 boundaries are determined and SCP-SCPINFO table 23 is accordingly created. More specifically, SCP-SCPINFO table 23 is copied from a PCE-SCPINFO table 24 that is created by the PCE at POR. Thereafter, PFT 31 is created by the SCP. The creation of, and structure associated with, PFT 31 and SCPINFO 23 is conventional.

According to the techniques of the present invention, when a region of storage is freed by the SCP for use by the system as HSA storage, the PFT entries 33 (i.e., page descriptors) associated with the freed storage region are modified. Specifically, status indicators within PFT entries 33 are changed to off-line such that the SCP may no longer use the corresponding pages. When the freed storage region is converted into HSA by PCE 21, PCE-SCPINFO 24 is modified accordingly. Specifically, the pages associated with the freed storage region are deleted from the CSTORE 27 or ESTORE 29 lists (i.e., depending on which type of storage was freed) and are added to the HSA list 25. PCE-SCPINFO 24 is then copied to SCP-SCPINFO 23 by, for example, the "Read SCPINFO" SCLP command ("Service Call Logical Progressing Command"). This command is initiated by the SCP as a result of an operator entering a command comprising, e.g., "CONFIG STORE, REFRESH" on the SCP console. This command causes the SCP to recognize that SCP-SCPINFO 23 requires refreshing and causes issuance of the "Read SCPINFP" SCLP command such that PCE-SCPINFO 24 is copied to SCP-SCPINFO 23.

After SCPINFO 23 has been updated, the PFT is modified such that the PFT entries 33' (FIG. 3) (only one shown for purposes of clarity) corresponding to the new HSA region 35 are updated to reflect those regions status as HSA (FIG. 3). The SCP will respect such status and refrain from using the new HSA region. Again, operational enlargement of HSA storage is accordingly complete.

Figure 5:
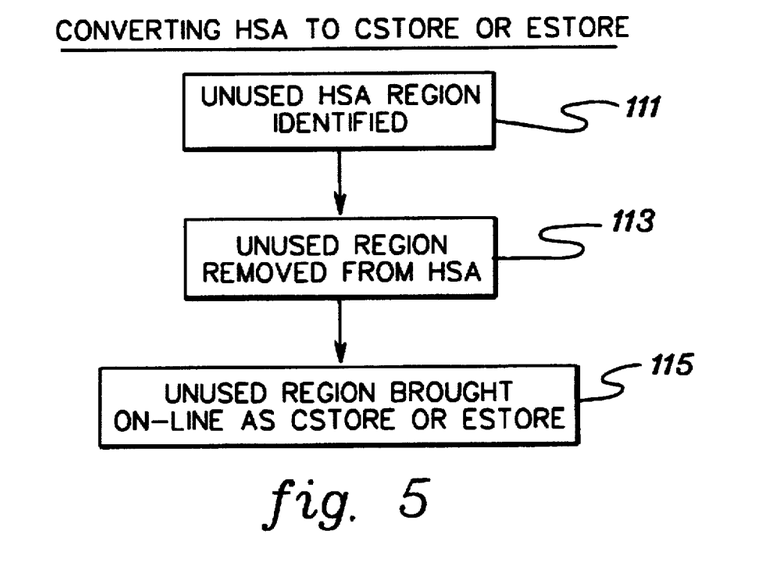
FIG. 5 is a flow diagram of a method for converting HSA storage to central storage or expanded storage in accordance with one embodiment of the present invention.

The above described process can be essentially reversed such that HSA storage is converted into one of central storage or expanded storage (FIG. 5). During operation of the computer system, a region of HSA may become unused. This may result from, for example, a hardware configuration change in the system. It would be wasteful to allow the now unused HSA storage area to remain unutilized so it is desirable to convert this storage area into usable central storage or expanded storage.

The unused region of HSA is first identified (111). This identification may be manually performed, or automatically provided upon the aforementioned system configuration change. For example, an operator at a system (i.e., hardware) console may scan a system memory map to find the amount of unused HSA. The unused HSA region is removed from the HSA by an operator at a hardware console via an SLC command and the PCE (113). The unused region is removed from HSA list 25 in SCPINFO 23 (FIG. 2) and added to either the CSTORE 27 list or ESTORE 29 list depending on what type of storage the unused HSA region is being converted to. The designation of CSTORE or ESTORE is provided within the syntax of the SLC used to modify the CSTORE/ESTORE lists.

To continue, the appropriate PFT (CSTORE OR ESTORE) is updated such that entries 33 corresponding to the now freed HSA area are so indicated as being on-line (115). This is performed using the "CONFIG [E]STORE (<address list>), ONLINE" SCP operator command. Conversion of HSA storage to either central storage or expanded storage is thus complete.

Figure 6:
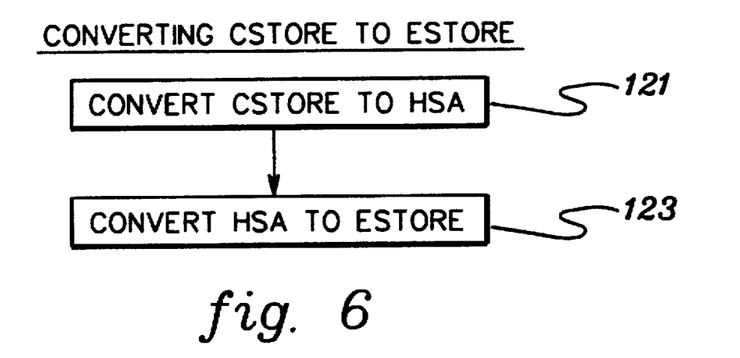
FIG. 6 is a flow diagram of a method for converting central storage to expanded storage pursuant to an embodiment of the present invention.
Figure 7:
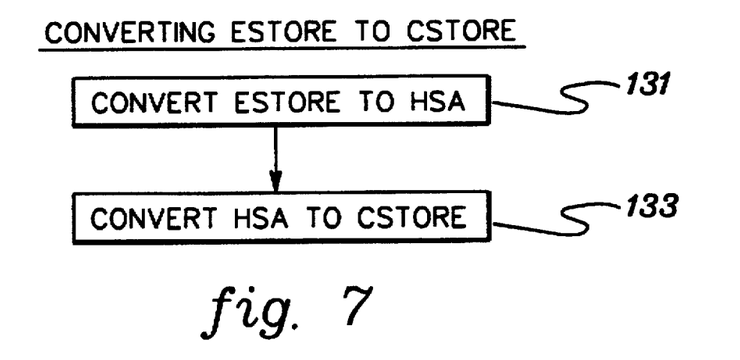
FIG. 7 is a flow diagram of a method for converting expanded storage to central storage according to one embodiment of the present invention.

The techniques of the present invention may be used to convert a region of storage between central storage and expanded storage. Such conversion is performed by using HSA storage as an intermediate status for the converted region of storage. To convert a region of central storage to expanded storage (FIG. 6), the region of central storage is first converted to HSA storage (121). Thereafter, the region of HSA storage is converted to expanded storage (123). The complementary conversion of a region of expanded storage to central storage is depicted in the flow diagram of FIG. 7. A region of expanded storage is first converted to HSA storage (131) which is subsequently converted to central storage (133). The individual conversions are performed using the techniques disclosed hereinabove.

Although the above described embodiments have been discussed with reference to an operator manually performing tasks at the system hardware console and SCP console, such tasks may be automated. An example of an applicable automation technique may be found in U.S. patent application Ser. No. 08/387,360, entitled "SYSTEM AND METHOD FOR DYNAMICALLY PERFORMING RESOURCE RECONFIGURATION IN A LOGICALLY PARTITIONED DATA PROCESSING SYSTEM," filed Feb. 13, 1995, which is a file Wrapper Continuation of U.S. patent application Ser. No. 07/963,498, entitled "SYSTEM AND METHOD FOR PERFORMING RESOURCE RECONFIGURATION IN A COMPUTER SYSTEM," filed Oct. 19, 1992, now abandoned.

The present invention has many advantages and features associated with it. By enabling operational enlargement of HSA storage through the conversion of central storage or expanded storage thereto, system availability and maintainability are enhanced. Specifically, system maintenance comprising a POR is unnecessary each time a hardware modification requiring increased HSA size is performed. Furthermore, the techniques disclosed herein obviate any need to reserve large amounts of unused HSA in anticipation of future upgrades. HSA may also be reduced in size such that the HSA associated with removed resources is no longer unused and wasted. Such HSA may be operationally converted into useful system storage. Moreover, intermediate conversion to/from HSA may be used to convert between different storage types (e.g., central to expanded). In summary, the present invention provides an improvement to overall memory management in computing systems.

The techniques disclosed herein are applicable in both basic mode and logically partitioned mode of IBM system 390 class processing hardware.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. A method for increasing the size of hardware system area ("HSA") storage in a data processing system, said HSA storage being outside of the addressable memory used by, and therefore not directly accessible by, a system control program ("SCP") during operation of said data processing system, said method comprising:

(a) identifying a region of storage as free; and (b) incorporating said region of storage into said HSA storage such that said size of said HSA storage is increased, said incorporating being performed subsequent to initialization, and during said operation, of said data processing system.

2. The method of claim 1, wherein said identifying (a) comprises freeing said region of storage from use as one of central storage and expanded storage, said one of central storage and expanded store being inside of the addressable memory used by, and therefore directly accessible by, the SCP during operation of said data processings system.

3. The method of claim 2, wherein said freeing is performed by an operator from a system control program ("SCP") console.

4. The method of claim 2, wherein said HSA storage contains information describing hardware of the data processing system, and said one of central and expanded storage contains general information used by the SCP during operation of the data processing system.

5. The method of claim 2, wherein said identifying (a) further comprises logically setting said region of storage off-line.

6. The method of claim 5, further comprising, after said logically setting, removing said region of storage from availability as one of central storage and expanded storage.

7. The method of claim 1, wherein said incorporating (b) comprises instructing a processor control element ("PCE") to engage said region of storage as HSA.

8. The method of claim 7, further comprising adding said region of storage to a system control table.

9. The method of claim 7, wherein said instructing is performed by an operator from a system hardware console.

10. The method of claim 7, wherein said incorporating (b) further includes informing said system control program that said region of storage comprises HSA storage.

11. The method of claim 10, wherein said informing is performed by an operator from a system control program ("SCP") console.

12. A system for increasing the size of hardware system area ("HSA") storage in a data processing environment, said HSA storage being outside of the addressable memory used by, and therefore not directly accessible by, a system control program ("SCP") during operation of said data processing environment, said system comprising:

means for identifying a region of storage as free; and means for incorporating said region of storage into said HSA storage such that said size of said HSA storage is increased, wherein said incorporating is performed subsequent to initialization, and during said operation, of said data processing environment.

13. The system of claim 12, further comprising means for freeing said region of storage from use as one of central storage and expanded storage after said identifying and prior to said incorporating, said one of central storage and expanded storage being inside of the addressable memory used by, and therefore directly accessible by, the SCP during operation of said data processing environment.

14. The system of claim 13, wherein said means for freeing includes an operator actuated system control program ("SCP") console.

15. The system of claim 13, wherein said HSA storage contains information describing hardware of the data processing system, and said one of central and expanded storage contains general information used by the SCP during operation of the data processing environment.

16. The system of claim 13, wherein said means for identifying further comprises means for logically setting said region of storage off-line.

17. The system of claim 16, further comprising, means for, after said logically setting, removing said region of storage from availability as one of central storage and expanded storage.

18. The system of claim 12, wherein said means for incorporating includes means for instructing a processor control element ("PCE") to engage said region of storage as HSA storage.

19. The system of claims 18, further comprising means for adding said region of storage to a system control table.

20. The system of claim 18, wherein said means for instructing comprises an operator actuated system hardware console.

21. The system of claim 18, wherein said means for incorporating further includes means for informing said system control program that said region of storage comprises HSA storage.

22. The system of claim 21, wherein said means for informing comprises an operator activated system control program ("SCP") console.

23. A method for decreasing the size of hardware system area ("HSA") storage in a data processing system, said HSA storage being outside of the addressable memory used by, and therefore not directly accessible by, a system control program ("SCP") during operation of said data processing system, said method comprising:

(a) removing a region of storage from said HSA storage; and (b) incorporating said region of storage as a region of storage other than said HSA storage such that said size of said HSA storage is decreased, wherein said incorporating is performed subsequent to initialization, and during said operation, of said data processing system.

24. The method of claim 23, wherein said region of storage other than said HSA storage comprises one of central storage and expanded storage, said one of central storage and expanded storage being inside of the addressable memory used by, and therefore directly accessible by, the SCP during operation of said data processing system.

25. The method of claim 24, wherein said HSA storage contains information describing hardware of the data processing system, and said one of central and expanded storage contains general information used by the SCP during operation of the data processing system.

26. The method of claim 23, wherein said removing (a) comprises instructing a processor control element ("PCE") to disengage said region of storage from use as HSA.

27. The method of claim 26, wherein said incorporating (b) comprises setting a status of said region of storage in a system table as on-line for use as said region of storage other than said HSA storage.

28. The method of claim 27, wherein said removing (a) and said incorporating (b) are performed by an operator from at least one console.

29. A system for decreasing the size of hardware system area ("HSA") storage in a data processing environment, said HSA storage being outside of the addressable memory used by, and therefore not directly accessible by, a system control program ("SCP") during operation of said data processing environment, said system comprising:

means for removing a region of storage from said HSA storage; and means for incorporating said region of storage as a region of storage other than said HSA storage such that said size of said HSA storage is decreased, wherein said incorporating is performed subsequent to initialization, and during said operation, of said data processing environment.

30. The system of claim 29, wherein said region of storage other than said HSA storage comprises one of central storage and expanded storage, said one of central storage and expanded storage being inside of the addressable memory used by, and therefore directly accessible by, the SCP during operation of said data processing environment.

31. The system of claim 30, wherein said HSA storage contains information describing hardware of the data processing system, and said one of central and expanded storage contains general information used by the SCP during operation of the data processing environment.

32. The system of claim 29, wherein said means for removing comprises means for instructing a processor control element ("PCE") to disengage said region of storage from use as HSA.

33. The system of claim 32, wherein said means for incorporating comprises means for setting a status of said region of storage in a system table as on-line for use as said region of storage other than said HSA storage.

34. The system of claim 33, wherein said means for removing and said means for incorporating comprise at least one operator activated console.

35. A method for converting one type of storage to another type of storage in a data processing system, comprising:

(a) converting said one type of storage to hardware system area ("HSA") storage, said HSA storage being outside of the addressable memory used by, and therefore not directly accessible by, a system control program ("SCP") during operation of said data processing system; and (b) converting said HSA storage to said other type of storage.

36. The method of claim 35, wherein said converting (a) comprises freeing said one type of storage from use and incorporating said one type of storage into said HSA storage, said incorporating being performed subsequent to initialization, and during said operation, of said data processing system.

37. The method of claim 36, wherein said converting (b) comprises freeing said HSA storage from use and incorporating it into said other type of storage, said incorporating being performed subsequent to initialization, and during said operation, of said data processing system.

38. The method of claim 35, wherein said one type of storage comprises one of central storage and expanded storage, and wherein said other type of storage comprises the other of central storage and expanded storage, said one of central and expanded storage being inside of the addressable memory used by, and therefore directly accessible by, the SCP during the operation of said data system.

39. The method of claim 38, said HSA storage contains information describing hardware of the processing system, and said one of central and expanded storage contains general information used by the SCP during operation of the data processing system.

40. A system for converting one type of storage to another type of storage in a data processing environment, said system comprising:

(a) means For converting said one type of storage to hardware system area ("HSA") storage, said HSA storage being outside of the addressable memory used by, and therefore not directly accessible by, a system control program ("SCP") during operation of said data processing environment; and (b) means for converting said HSA storage to said other type of storage.

41. The system of claim 40, wherein said means for converting (a) comprises means for freeing said one type of storage from use and for incorporating said one type of storage into said HSA storage, said incorporating being performed subsequent to initialization, and during said operation, of said data processing environment.

42. The system of claim 41, wherein said means for converting (b) comprises means for freeing said HSA storage from use and for incorporating it into said other type of storage, said incorporating being performed subsequent to initialization, and during said operation, of said data processing environment.

43. The system of claim 40, wherein said one type of storage comprises one of central storage and expanded storage, and wherein said other type of storage comprises the other of central storage and expanded storage, said one of central and expanded storage being inside of the addressable memory used by, and therefore directly accessed by, the SCP during operation of said data processing environment.

44. The system of claim 43, wherein said HSA storage contains information describing hardware of the data processing system, and said one of central and expanded storage contains general information used by the SCP during operation of the data processing environment.

* * * * *

UNITED STATES PATENT AND TRADEMARK OFFICE
CERTIFICATE OF CORRECTION

PATENT NO. : 5,784,701
DATED : July 21, 1998
INVENTOR(S) : Greenstein et al.

It is certified that error appears in the above-identified patent and that said Letters Patent is hereby corrected as shown below:

Col. 7, line 61, delete "claims 18" and replace with --claim 18--.

Signed and Sealed this

Twenty-ninth Day of June, 1999

Attest:

Q. TODD DICKINSON

Attesting Officer     Acting Commissioner of Patents and Trademarks